United States Patent [19]

Petersen

[11] Patent Number: 4,709,601

[45] Date of Patent: * Dec. 1, 1987

[54] LONG NOSE LOCKING PLIERS

[75] Inventor: Christian Petersen, DeWitt, Nebr.

[73] Assignee: Petersen Manufacturing Co., Inc., Dewitt, Nebr.

[*] Notice: The portion of the term of this patent subsequent to Oct. 15, 2002 has been disclaimed.

[21] Appl. No.: 776,226

[22] Filed: Sep. 16, 1985

Related U.S. Application Data

[63] Continuation of Ser. No. 353,860, Mar. 2, 1982, Pat. No. 4,546,680, which is a continuation-in-part of Ser. No. 943,180, Sep. 18, 1978, Pat. No. D. 261,096, and a continuation-in-part of Ser. No. 241,085, Mar. 6, 1981, Pat. No. 4,541,312.

[51] Int. Cl.[4] .............................. B25B 7/12
[52] U.S. Cl. ............................. 81/367; 81/418
[58] Field of Search ................. 81/367–380, 81/418–427, 472, 900; 29/254

[56] References Cited

U.S. PATENT DOCUMENTS

| D. 136,188 | 8/1983 | Payne | D8/22 |
| 591,720 | 10/1897 | Armstrong | 81/426 |
| 2,563,267 | 8/1951 | Petersen | 81/424.5 |
| 2,590,031 | 3/1952 | Petersen | 81/418 |
| 2,848,810 | 8/1958 | Wendt | 7/134 |
| 2,853,910 | 9/1958 | Petersen | 81/368 |
| 3,192,804 | 7/1965 | Petersen et al. | 81/370 |
| 3,748,733 | 7/1973 | McClellan | 7/133 |
| 3,791,012 | 2/1974 | Jenkin | 81/463 |
| 4,023,450 | 5/1977 | Ygfors | 81/418 |
| 4,208,749 | 6/1980 | Hermann et al. | 7/133 |
| 4,307,365 | 12/1981 | Genova | 81/463 |
| 4,541,312 | 9/1985 | Petersen | 81/367 |
| 4,546,680 | 10/1985 | Petersen | 81/367 |

FOREIGN PATENT DOCUMENTS 1355269  6/1974  United Kingdom .................. 81/375

*Primary Examiner*—Frederick R. Schmidt
*Assistant Examiner*—Bradley I. Vaught
*Attorney, Agent, or Firm*—Lackenbach Siegel Marzullo & Aronson

[57] ABSTRACT

A long nose locking hand tool having a pair of opposing jaw members, a fixed handle and a movable handle and lever locking means therebetween for maintaining a toggle relationship between the jaws when in a closed position; and wherein each of said jaw members comprising a jaw face configuration having a total jaw length to average jaw height ratio of from about 6.5 to about 11.5 with a through jaw hardness range of from about 53 to about 57 Rockwell C, with said jaw members made of an alloy spring steel, said jaw members having a nominal parallel opening when they are spaced apart, no greater than about ¼ inch, thereby enabling said jaw members to clamp a workpiece therebetween with parallel jaw faces by flexing to the parallel condition when closed and returning to their original unstressed state when released of clamping pressure.

A long nose locking hand tool having a pair of opposing jaw members, a fixed handle having an adjustment screw, and a movable handle and lever locking means therebetween for maintaining a toggle relationship between the jaw faces of said jaw members when in a closed position; and wherein said fixed handle having a strike surface, and having an axis passing through said strike surface defining the direction of a line of force impartable to the hand tool; and said pair of jaws further defining a bisecting axis or line formed by the angle of said jaws when closed against a workpiece gripped therebetween; and the angle between said axes being less than 5° when the gripping tips of said jaw member are in a generally touching or closed position.

12 Claims, 4 Drawing Figures

LONG NOSE LOCKING PLIERS

This application is a continuation of my earlier filed copending application Ser. No. 353,860, filed Mar. 2, 1982, now U.S. Pat. No. 4,546,680, which is a continuation-in-part patent application of my earlier filed copending U.S. design patent application, Ser. No. 943,180 now U.S. Pat. No. Des. 261,096, filed Sept. 18, 1978; and is a continuation-in-part patent application of my earlier filed copending U.S. patent application, Ser. No. 241,085 filed Mar. 6, 1981 now U.S. Pat. No. 4,541,312.

This invention relates to in general a class of locking hand tools, such as locking pliers, and more particularly to long nose locking pliers of the adjustable type embodying a locking toggle.

BACKGROUND OF THE INVENTION

Heretofore in the art, practically all locking pliers/wrenches have been of the type generally comprising substantially large size or "bit mouth" jaws for general duty use even though the nominal overall length of the tool may be different, say from small to large size, for example, five to ten inches. Furthermore, other more specific types of hand clamping tools embody modified jaw forms, such as C-shaped jaw members, straight jaws, curved jaws, pinch-off jaws, elongated flat plate-like jaws for sheet metal work, welding clamp jaws, or movable jaw members coupled with a chain clamping means enabling a work piece, such as a pipe, to be effectively gripped.

The following U.S. patents are representative of the class of locking tools in the art employing various jaw members and which also generally comprise handle members including some form of toggle-actuation for locking a workpiece between a pair of jaws of a locking plier or locking wrench.

| U.S. Pat. No. | Date | Name |
|---|---|---|
| 1,489,458 | April 8, 1924 | W. Petersen |
| 2,201,918 | May 21, 1940 | W. Petersen |
| 2,229,454 | Oct. 20, 1942 | H. C. Borchers |
| 2,280,005 | April 14, 1942 | W. Petersen |
| 2,341,489 | Feb. 8, 1944 | J. E., R. M. Tornberg |
| 2,417,013 | March 4, 1947 | W. Petersen |
| 2,563,267 | Aug. 7, 1951 | C. Petersen |
| 2,590,031 | Mar. 18, 1953 | C. Petersen |
| 2,641,149 | June 9, 1953 | C. Petersen |
| 2,711,663 | June 28, 1955 | W. Petersen |
| 3,192,804 | July 6, 1965 | C. Petersen, et al |
| 3,585,704 | June 22, 1971 | J. A. Schroeder |
| 3,590,669 | July 6, 1971 | Vincent Marasco |

The above-identified Petersen patents are all precursers and forerunners of contemporary locking hand tools marketed for years by Petersen Manufacturing Co., Inc. of DeWitt, Neb. 68341. A 1981 General Catalog is attached to this specification for the purposes of more particularly illustrating and providing additional descriptive material clearly disclosing the various models of Petersen's locking pliers and other locking hand tools, which incidentally and to this day are all identified by one or more "Vise-Grip" trademarks of Petersen Manufacturing Co., Inc.

In addition to the above-mentioned prior art patents, the following U.S. patents are examples of a class of more conventional pliers.

| U.S. Pat. No. | Date | Name |
|---|---|---|
| 1,141,786 | June 1, 1915 | W. O. Eilert |
| 1,442,083 | Jan. 16, 1923 | A. J. Meyer |
| 1,504,401 | Aug. 12, 1924 | W. C. Tull, et al |
| 2,847,889 | Aug. 19, 1958 | F. O. Cain |

Illustrative of recent pliers of the conventional class which have found wide use in numerous newer industries, such as those involving electronic and computer applications are the long nose, needle nose, curved needle nose and other specialty pliers as shown and described on pages 105 and 110 of a Proto Tool Catalog and page 12 of a Mathias Klein Tool Catalog, copies of which are available at the Patent and Trademark Office, but which are nevertheless also attached to this specification for the attention of the Patent and Trademark Office in order to facilitate its work in searching for prior art relevant to the present invention.

The only known prior art long nose* locking plier is U.S. Pat. No. 3,600,986, granted to Earl M. Baldwin, Jr. on Aug. 24, 1971 (copy also enclosed with this application). This locking hand tool is also known by the trademark "Lever Wrench", a registered trademark of Leverage Tools, Inc. of Glenvil, Neb., 68941. This prior art Leverage company tool (Model #1-8) is a self-adjusting long nose toggle plier which is difficult to operate and even more difficult to adjust to a desired pressure. Moreover, the Lever Wrench is clumsy and awkward to use as a locking plier because upon pushing its movable lever handle outward to unlock the tool, the jaws do not at once begin to move apart, it being necessary to continue moving the lever handle outward through a considerable arc before the jaws actually begin to move apart, with the result that there is a great amount of lost motion and one's hand must be open much too far to move the jaws apart. Another disadvantage of the Lever Wrench tool is that it is case hardened, that is, the core is soft and only a thin outer skin or shell is hardened. Typical hardness readings of the jaw surfaces of such a long nose locking plier are about 58–60 Rockwell C scale with the skin or shell measuring about 0.005 inch at maximum. The core readings range from about 28–30 Rockwell C scale. Although the outer skin or shell exhibits suitable hardness for a long nose locking plier, the use of inherently lower grade steels causes the jaws, when under considerable pressure, in tightly gripping a workpiece, to easily deflect outwardly and bend excessively and to set permanently without spring back, thereby precluding restoration of the jaws to their original unstressed shape and condition even if such action is within elastic limits of the steels employed.

*not shown in patent

In addition to the above known long nose locking plier, applicant has filed in many foreign countries for equivalent design protection based on my U.S. Ser. No. 943,180 (now U.S. Pat. No. Des. 261,096; granted Oct. 6, 1981) and a number of the counterpart Industrial Design applications have since been issued and registered as more particularly identified in my declaration accompanying this utility patent application.

One of the main disadvantages of the above-noted locking tools is that they are generally designed for various applications, and their configurations and structural elements, particularly the special shaped jaws are too blunt, short, or stubby to reach small or tight places and are generally not suitable or useful in tight quarters and for many delicate jobs. With my unique and novel long nose locking plier, any desired amount of pressure can be applied to hold small and fragile objects, such as jewelry, electronic components, tiny springs, cotter pins, etc., all with a fine fingertip like control.

SUMMARY OF THE INVENTION

It is, therefore, a principle object of the invention to provide an improved long nose locking plier which overcomes all of the disadvantages of the prior art locking tools.

Another object of the invention is to provide a long nose locking plier with a pair of jaws which are somewhat flexible and capable of springing back when released from a stressed pressure condition so long as the elastic limit of the metal tool is not exceeded.

A further object of the invention is to provide a long nose locking plier of a suitably hardened steel, and one which is entirely hardened through and through.

Yet another object of the invention is to provide a long nose locking plier which may be used for holding and starting nails in tight quarters where little room is available for the use of more conventional tools.

Still another object of the invention is to provide a long nose locking plier, which exhibits an improved dimensional ratio and a suitable hardness range, which together with the characteristics of the steel employed, imparts the desired flexibility to the jaws of the long nose locking plier.

Still further it is an object of the invention to provide a long nose locking plier constructed of an oil hardened spring and tool steel having relatively high amounts of silicon and manganese.

Another object of the invention is to provide a long nose locking plier having a flexibility ratio expressed as a function of total jaw length to average jaw height.

Yet still another object of the invention is to provide a long nose locking plier having a flexibility ratio which is expressed as a function of the total length of the straight teeth portion of the jaw to the average jaw height.

These and other objects of the invention are achieved by a long nose locking plier having a pair of opposing jaw members, a fixed handle and a movable handle and lever locking means therebetween for maintaining a toggle relationship between the jaws when in a closed position; and wherein each of said jaw members comprising a jaw face configuration having a total jaw length to average jaw height ratio of from about 6.5 to about 11.5 with a jaw hardness range of from 53 to about 57 Rockwell C, with said jaw members made of an alloy spring and tool steel having a parallel opening no greater than about ¼ inch enabling said jaw members to clamp a workpiece therebetween with substantially parallel jaw faces.

The objects of the invention are also achieved by a long nose locking plier having a pair of opposing jaw members, a fixed handle having an adjustment screw, and a movable handle and lever locking means therebetween for maintaining a toggle relationship between the jaw faces of said jaw members when in a closed position; and wherein said fixed handle having a straight strike surface, and having an axis passing through said strike surface defining the direction of a line of force impartable to the hand tool; and the pair of jaws further defining a bi-secting axis or line formed by the angle of the jaws when closed against a workpiece gripped therebetween; and the angle bertween said axes being less than about 5° when the gripping tips of the jaw members are in a generally touching or closed position.

BRIEF DESCRIPTION OF THE DRAWINGS

The invention will now be described and explained in greater detail, and the invention will be better understood and the objects will become apparent, when consideration is given to the following detailed description when taken with reference to the accompanying drawings which form an integral part of this patent application and wherein.

DESCRIPTION OF THE PREFERRED EMBODIMENTS

Figure 1:
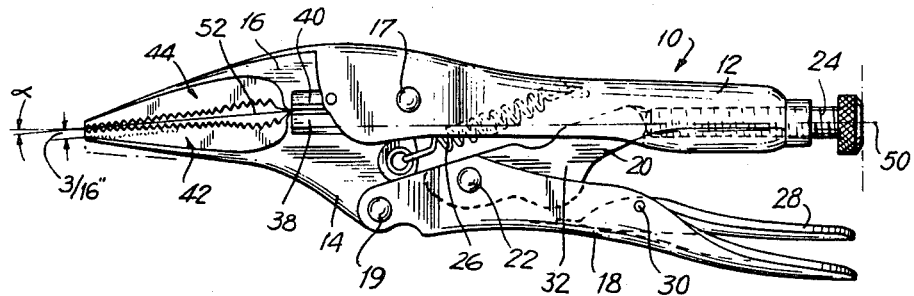
FIG. 1 is a side elevational view of my novel long nose locking plier with hidden parts shown in phantom.

As best shown in FIG. 1, the long nose locking plier is generally designated by the reference numeral 10, and includes a handle member 12, and a movable clamping member of lower jaw 14. The handle member 12 is provided with a stationary clamping element or upper jaw 16. A toggle mechanism comprises an elongated handle member 18 and a toggle-link member 20 which is conventionally pivotally engaged at one end about the pin 22. The other free end (shown in phantom) of the toggle link member 20 is engaged with the handle member 12, and in particular the abutment end (also shown in phantom) of an adjustment screw 24 which is suitably threadably engaged at the end of the handle member 12. The forward end of the handle member 18 is preferably bifurcated or forked, and a corner portion of the movable clamped member 14 is suitably disposed within the fork or between the bifurcation arms by pivot pin means 19. Similarly, the handle member 12 is preferably channel-shaped, and receives another corner portion of the movable clamping element 14 which is also suitably secured thereto by means of a pivot pin 17.

Spring means 26, preferably in the form of an extension coil spring, is secured between the handle member 12 and the movable clamping element 14 or lower jaw, to urge the clamping element 14 away from the stationary clamping element when the jaws are opened.

An elongated release lever 28 is suitably pivotably mounted by means of a pin 30, to the inside of the handle member 18, and is provided with a forwardly extending portion (as shown in phantom) and is engageable with a projection 32 of the toggle-like member 20 which extends toward the handle member 18. When the release lever 28 is pivoted about the pin 30, the handle member 12 is moved away from the handle member 18.

It will be appreciated that the wrench or locking plier mechanism and toggle construction described herein with the exception of the long nose jaws conforms basically in accordance with the construction described in U.S. Pat. No. 1,489,458. Furthermore, such construction, the operation thereof, and the specific operation of the release lever is clearly set forth in U.S. Pat. No. 3,192,804. As explained in these Petersen prior art patents, closing of a locking wrench or plier incorporating a toggle device is effected by moving the relatively movable handle member 18 toward the relatively fixed handle member 12. This movement forces the upper end of the toggle-like member 20 to move inwardly towards the handle member 12. The pivot pin 22 also moves inwardly, and when such pivot pin moves over center, the plier is locked in a closed position.

Figure 2:
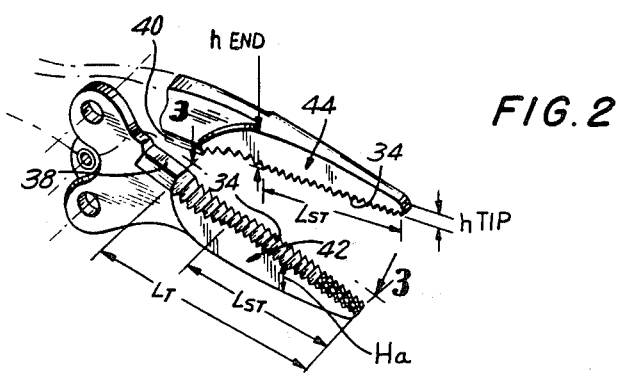
FIG. 2 is a perspective view of the jaws of my locking plier, but with the upper jaw broken away to illustrate the entire lower jaw.
Figure 3:
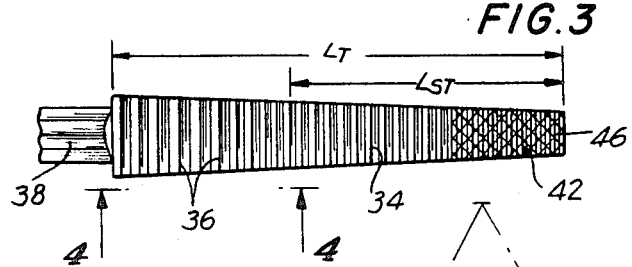
FIG. 3 is a plan view along the line 3—3 of FIG. 2.
Figure 4:
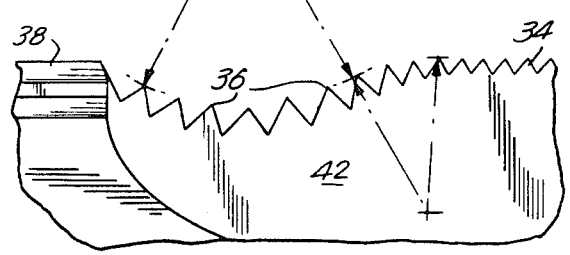
FIG. 4 is a greatly enlarged, fragmentary, side elevational view of the involute section of my teeth illustrating the reverse arcurate curve.

With reference to FIGS. 2-4, each jaw member 14, 16 comprises a straight front portion 34 with transverse teeth and a reverse involute curved position 36 with similar transverse teeth at the rearward portion of the jaws. A conventional wire cutter comprising a lower blade 38 is positioned at the inner portion of the working face of the movable jaw member 14 and an upper anvil 40 is positioned at the inner portion of the working face of the fixed jaw member 16. The blade 38 is suitably oppositely beveled as is conventional in the art. At the extreme front end or tip portions of the jaws 14 and 16, suitable gripping means in the form of a knurl 46, are provided for about a length of about ¼ to about ½ inch in lieu of transverse teeth. The involute curvatures of the jaws enable large round bodies as well as polygonal shaped bodies, such as hex nuts, bolt heads and the like to be grasped in such a manner that opposite flat surfaces thereof will be engaged over substantially the entire area of such surfaces and accordingly there is a firmer grip upon the nut or bolt head. FIG. 4 clearly illustrates the reverse curvature of the involute sections which follows the radial paths shown by the radii drawn in dot-dash lines.

For a more complete understanding of the curved jaws, reference is made to my U.S. Pat. No. 2,563,267 noted hereinabove with reference to the prior art background of the invention.

As best shown in FIGS. 2 and 3, the jaw faces or portions 42, 44 are wider than the main body of the jaw members 14, 16 and generally taper a few degrees from the widest point at the end of the involute portion 36 to the narrowest point representing a thin jaw tip 46 at the ends of each jaw face or portion 42, 44 of my long nose locking plier. Preferably, as an example in the case of a medium sized long nose locking plier with a nominal overall length of 6 inches, the width or jaw thickness at the tips is about ⅛ inch and at the base thereof is about 5/16 inch. It should also be noted that the jaw members are shown in phantom in FIG. 1 to be spaced in a parallel position at a nominal distance of about 3/16 inch. These jaw faces or portions 42, 44, which preferably are straight for a length of about 1¼ inches (overall length being about 1¾ inches), when pivoted away from each other are in parallel at said predetermined set position of separation which in the present invention occurs at the nominal spacing of about 3/16 inch which is preferred in a medium sized long nose locking plier as below the 3/16 inch spacing most use and applications of the long nose locking pliers would take place, whether one is handling or installing small parts, pulling or bending pins, wires, keys, etc., retrieving fish hooks, clamping parts, or cutting a piece of hard spring wire or a monofilament winding material. Also, most small items or parts can be gripped with a substantial portion thereof lying flat on the jaws, in contrast to being just gripped at the tip of the jaws, as for example when using conventional long nose pliers, which jaws are all essentially parallel at zero, and have a plain simple scissors action when a part is squeezed between the jaws. The jaw adjustment, nevertheless, is capable of opening to about 2¼ inches at the tips, and 1 inch at the base thereof at maximum condition. However, with a workpiece larger than 3/16 inch, the jaw faces of a medium sized long nose locking plier are incapable of attaining a paralleled position when the workpiece is gripped therebetween, but with a larger sized long nose locking plier a nominal parallel sized opening of about ¼ inch may be employed in the practice of the invention.

With the jaws of the present invention, a parallel opening is maintained as a part is gripped and squeezed therebetween so long as the size of the workpiece is within the nominal parallel size opening. Thus even with a very tiny part of 1/16 inch or less, and regardless of the size of the long nose locking plier, once the jaws are locked down to it, the narrow ends of the jaws flex or spring to assume the part's thickness and thereby positively and tightly hold the part with a parallel jaw condition. The long nose jaw members are formed so as to provide elasticity to them enabling a parallel condition to be created when the jaws are locked and squeezed about a workpiece. The built-in jaw resiliency enables the jaw members to spring to the size of the clamped workpiece. Thus, the actual parallel opening between the jaws when being used, is the effective thickness of the part. Of course, and as noted hereinabove, the effective parallel opening of the jaw members from the nominal parallel opening be it 3/32, 3/16 or even ¼ is only experienced in the downward or smaller dimension as no such parallelism between the jaws can be achieved if a workpiece larger than the nominal parallel opening is clamped.

The long nose jaw members are, therefore, critical in their construction and their profile is important in that each of the jaw members preferably have a jaw face configuration having a total jaw length (Lt) to average jaw height (Ha), ratio of from about 6.5 to about 11.5 with a jaw hardness range of from about 53 to about 57 Rockwell C scale, with the jaw members made from an alloy steel having properties of desired strength and toughness, as well as requisite flexibility. The average jaw height (Ha) being the average of the minimum jaw height at the tip thereof and the jaw height at the last or end straight tooth adjacent the curved portion 36. FIG. 2 best illustrates these relative dimensions, along with dimensions which establish a more preferred jaw face configuration for a 6 inch nominal length long nose locking plier, which is considered to be of a medium size where the straight flat jaw portion length (Lst) to average jaw height (Ha) ratio is from about 4.5 to about 6.5.

An even more preferred range of the straight flat jaw portion length (Lst) to average jaw height (Ha) ratio is from about 5 to about 6, with a most preferred ratio of about 5.5.

A more preferred range of the total jaw length (Lt) to average jaw height (Ha) ratio for such medium sized long nose locking plier is from about 7 to about 8, with a most preferred ratio of about 7.5.

A more preferred jaw hardness range, on the other hand with respect to any long nose locking plier of the invention, is from about 54 to about 55 Rockwell C scale, using an oil-hardening alloy spring and a tool steel having relatively higher amounts of silicon and manganese than other plain carbon tools or alloy tool steels. Below Rockwell 53, the steel is too soft and above Rockwell 57, the steel may break.

As best shown in FIG. 1, the fixed handle has a strike surface (straight flat surface of knurled end know of the adjustment screw 24) and has an axis 50 passing through the strike surface defining the direction of a line of force impartable to the locking plier.

This axis, identified by the reference numeral 50, passes from the gripping tip or end edge of the fixed jaw face through about the center line of the adjustment screw 24 and it defines the line of force impartable to the tool, such as for example, if one were to strike the flat head of the adjustment screw 24 with a tack hammer. The axis passing through the straight strike surface forms an angle with said straight strike surface of from about 87° to abut 93°, and said axis also passing through the gripping end tip or end edge of the fixed jaw face. Another axis line 52 defines a bisection line formed by the angle of the jaws when closed and gripped against a workpiece. The angle α between the two axes in the long nose locking plier of the present invention is less than about 5° when the gripping tips of the jaw members are in a generally touching or closed position. With such a small angle between the two axes, a nail such as a brad held by its head at the jaw tips and with the nail axis along the bisection line 52 can be easily started by simply tapping the head of the adjustment screw 24. Here the line of force of the blow to the head, which is substantially parallel to the body of the locking plier, is such that the force transmitted is virtually in line with the axis of the nail, rather than at an angle thereto which is less effective in starting the nail as the blow would tend to cause the nail to be deflected or bend since the force or blow is not directed along the nail axis. Also, with the structural arrangement of my small nose locking plier, no torque or rotating couple about the nail can take place as the force is transmitted substantially in line with the axis of the nail which is to be started.

It will be appreciated that the resiliency of the jaw members decrease or diminish as the thickness of the jaws increase. Consequently, most of the elastic action and bending takes place at the front ends of the jaw members which are more slender. Thus, the flexibility of the jaw members is a function of the L/H ratio and the higher the ratio, the greater the flexibility for a given or constant width and same tool steel material. It is, therefore, critical that the tips of the jaw members are thin in cross-section as if they have too much thickness, no bending or flexing action can take place when a workpiece is clamped (within the nominal parallel opening) between the jaws. On the other hand, embodying long slender neelde-like jaws would result in failure as the tips thereof would be very weak, and would easily break with the slightest pressure applied to a locking plier.

The nominal parallel opening, although not critical, is also important in that greater dimensions, over ¼ inch, ⅜ inch or ½ inch, a person would not be strong enough to spring the jaws sufficiently to assume a parallelism relationship about a workpiece, except on an object that is approximately the same size as the nominal parallel jaw opening. However, with a nominal parallel opening no greater than ¼ inch, one easily has sufficient power to "parallel" grip a small part which is of a size ¼ inch or less, and with such various sized long nose locking pliers of the invention, most delicate job requirements calling for a long nose tool would generally fall below this lower range. Obviously, with larger items, one would not consider a long nose locking plier.

The following sized jaws are exemplary (large, medium and small, respectively) long nose locking pliers of the invention:

---

$L_t$ = 2⅜ inches $L_{st}$ = 1½ inches
h tip = ⅛ inch h end = ⅜ inch
h base or last tooth = ½ inch
Jaw thickness: 3/16" at tips, 3/32" at base
Jaw adjustment: Opens to about 3" at tips about 1¾" at base.
Range of $L_t/H_a$ ratio: 8.0–11.0
Range of $L_{st}/H_a$ ratio: 5–7
Nominal parallel opening = ¼ inch
Overall Length: Nominal 9 inches
$L_t$ = 1¾ inches $L_{st}$ - 1¼ inches
h tip = 3/32 inch h end = ⅜ inch
h base or last tooth = 7/16 inch
Jaw thickness: ⅛" at tips, 5/16" at base
Jaw adjustment: Opens to about 2¼" at tips, about 1" at base
Range of $L_t/H_a$ ratio: 6.5–8.5
Range of $L_{st}/H_a$ ratio: 4.5–6.5
Overall Length: Nominal 6 inches
Nominal parallel opening = 3/16 inch
$L_t$ = 1-5/16 inches $L_{st}$ = ⅝ inch
h tip = 3/64 inch h end = ¼ inch
h base or last tooth = 9/32 inch
Jaw thickness: 3/32" at tips, 7/32" at base
Jaw adjustment: Opens to about 1⅛"at tips, about ¾" at base
Range of $L_t/H_a$ ratio: 7.5–10.5
Range of $L_{st}/H_a$ ratio: 5–7
Nominal parallel opening: 3/32 inch
Overall Length: Nominal 4½ inches

---

In the practice of the invention, as the nominal length of the long nose locking plier approaches about 9 inches, the teeth of the jaw members are approximately parallel for about the first ¾ inch in from the tip of the jaws with the remaining "straight" portions of the teeth curving away from each other at a radius approximately 6 inches, the curves of the jaws being convex and extending from the ends of the parallel portions to the curved involute jaw portions.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. A long nose locking hand tool having a pair of opposing jaw members, a fixed handle having an adjustment screw, and a movable handle and lever locking means therebetween for maintaining a toggle relationship between the jaw faces of said jaw members when in a closed position; wherein each of said jaw members comprising a jaw face configuration having a total jaw length to average jaw height ratio of from about 6.5 to about 11.5 with a through jaw hardness range of from about 53 to about 57 Rockwell C, with said jaw members made of an alloy spring steel, and wherein said fixed handle having a straight strike surface forming a part of said adjustment screw, and having an axis passing through said strike surface defining the direction of a line of force impartable to the hand tool; and said pair of jaws further defining a bisecting axis or line formed by the angle of said jaws when closed against a workpiece gripped therebetween; and the angle between said axes being less than about 5° when the gripping tips of said jaw members are in a generally touching or closed position.

2. The long nose locking hand tool according to claim 1, wherein for a medium sized tool each of said jaw faces includes a straight flat jaw portion and a curved jaw portion, and wherein the straight flat jaw portion length to average jaw height ratio is from about 4.5 to about 6.5.

3. The long nose locking hand tool according to claim 2, wherein the straight flat jaw portion length to average jaw height ratio is from about 5 to about 6.

4. The long nose locking hand tool according to claim 3, wherein the straight flat jaw portion length to average jaw height ratio is about 5.5.

5. The long nose locking hand tool according to claim 1, wherein for a medium sized tool the total jaw length to average jaw height ratio is from about 7 to about 8 and said axis passing through said straight strike surface forms an angle with said straight strike surface of from about 87° to about 93°, and said axis also substantially passing through the gripping end tip or end edge of said fixture or face.

6. The long nose locking hand tool according to claim 5, wherein the total jaw length to average jaw height ratio is about 7.5.

7. A long-nose locking hand tool, for gripping various sized workpieces, having a pair of opposing jaw members, a fixed handle, a movable handle, and lever locking means therebetween for maintaining a toggle relationship between the jaws when in a closed position; wherein each of said jaw members comprises a jaw face having transversely cut teeth, and a configuration having a total jaw length to average jaw height ration of from about 6.5 to about 11.5 with a through jaw hardness range of from about 53 to about 57 Rockwell C, with said jaw members made of an alloy spring steel, said jaw members having a nominal parallel opening when they are spaced apart no greater than ¼ inch, thereby enabling said jaw members to clamp a nominally sized workpiece by flexing said jaw faces to a substantially parallel condition when closed and returning to their original unstressed state when released of clamping pressure.

8. The long nose locking hand tool according to claim 7, including a wire cutter comprising a blade and an anvil on the jaw members.

9. The long nose locking hand tool according to claim 7, wherein each of said jaw faces include a curved portion.

10. The long nose locking hand tool according to claim 9, wherein said curved portion of said jaw faces comprise a reverse involute curvature.

11. The long nose locking hand tool according to claim 7, including a release lever pivotably mounted on said movable handle cooperatively associated with the toggle lever of said jaw members for urging said jaw members apart.

12. The long nose locking hand tool according to claim 7, further including a knurl portion at the distal end portions of said jaw faces.

* * * * *